United States Patent [19]

Adam et al.

[11] Patent Number: 4,667,057
[45] Date of Patent: May 19, 1987

[54] HALOGEN SUBSTITUTED AMIDOGLYCOLIC ACIDS

[75] Inventors: Jean-Marie Adam, Saint-Louis, France; Arthur Bühler, Rheinfelden, Switzerland

[73] Assignee: Ciba-Geigy Corporation, Ardsley, N.Y.

[21] Appl. No.: 425,594

[22] Filed: Sep. 28, 1982

Related U.S. Application Data

[62] Division of Ser. No. 191,551, Sep. 29, 1980, Pat. No. 4,426,328.

[30] Foreign Application Priority Data

Oct. 5, 1979 [CH] Switzerland .......................... 9017/79

[51] Int. Cl.[4] .......................................... C07C 103/58
[52] U.S. Cl. .................... 562/567; 534/640; 534/643; 534/644; 534/617
[58] Field of Search ......................................... 562/567

[56] References Cited

U.S. PATENT DOCUMENTS 3,431,299 3/1969 Levi et al. ............................ 562/567
4,105,690 8/1978 Christidis et al. ................... 562/567

FOREIGN PATENT DOCUMENTS 1103916 2/1968 United Kingdom ................ 562/567

OTHER PUBLICATIONS

Adam et al, Chemical Abstracts, vol. 95, #134378z (1981).

*Primary Examiner*—Floyd D. Higel
*Attorney, Agent, or Firm*—Edward McC. Roberts; Meredith C. Findlay

[57] ABSTRACT

Compounds of the formula

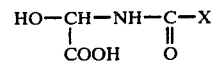

in which
X is a radical of the formula —CHCl—CH$_2$Cl, —CHBr—CH$_2$Br, —CCl=CH$_2$ or —CBr=CH$_2$, are prepared by halogenation of acryloylamidoglycolic acid and optionally elimination of hydrogen halide from the dihalogeno compounds by the action of alkali. The compounds are suitable as intermediates for reactive dyes.

1 Claim, No Drawings

HALOGEN SUBSTITUTED AMIDOGLYCOLIC ACIDS

This application is a division of Ser. No. 191,551, filed Sept. 29, 1980, now U.S. Pat. No. 4,426,328, issued Jan. 17, 1984.

The invention relates to fibre-reactive dyes of the formula

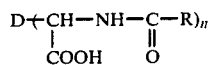  (1)

in which D is an organic dye radical which contains at least one group conferring solubility in water, R is a halogenoalkyl radical having 1 to 2 C atoms or a halogenoacryl radical and n is an integer from 1 to 4.

The radicals of the formula

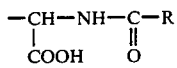  (2)

are each bonded to an aromatic carbon atom of D, in particular to a benzene nucleus.

The radical of an organic dye D in formula (1) can contain further substituents. Examples are: alkyl groups having 1 to 4 carbon atoms, such as methyl, ethyl, propyl, isopropyl and butyl, alkoxy groups having 1 to 4 carbon atoms, such as methoxy, ethoxy, propoxy, isopropoxy and butoxy, aryloxy groups, such as phenoxy or phenoxy substituted by chlorine, bromine, nitro, methyl or methoxy, acylamino groups having 1 to 6 carbon atoms, such as acetylamino, propionylamino and benzoylamino, halogen, such as fluorine, chlorine or bromine, nitro, cyano, trifluoromethyl, sulfamoyl or carbamoyl which are unsubstituted or N-monosubstituted or N,N-disubstituted by alkyl and/or aryl, and ureido, hydroxyl, carboxyl and sulfomethyl.

Preferably, D should contain a phenyl radical, which is unsubstituted or substituted by $C_1$-$C_4$-alkyl or $C_1$-$C_4$-alkoxy, since the novel reactive group can be introduced into such a radical particularly well.

The radical D preferably contains sulfo groups as the groups conferring solubility in water.

In particular, D is a dye of the anthraquinone, azo, dioxazine or phthalocyanine series which contains 1 to 3, preferably 1 or 2, sulfo groups.

Dyes of particular interest are the anthraquinone and azo dyes which contain one or 2 groups of the formula (1) and in which the radical R has one of the following meanings: —$CH_2Cl$, —$CH_2Br$, —$CCl$=$CH_2$, —$CHCl$—$CH_2Cl$ or in particular —$CHBr$—$CH_2Br$ and —$CBr$=$CH_2$.

Anthraquinone dyes which are of interest are, in particular, those of the formula

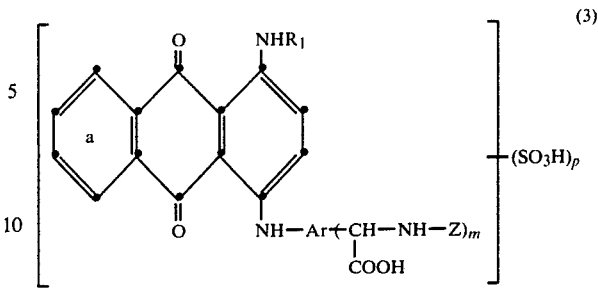

in which $R_1$ is hydrogen, cycloalkyl, low-molecular alkyl, aralkyl or aryl, Ar is an arylene radical, Z is an α,β-dichloro- or -dibromo-propionyl radical, an α-chloro- or α-bromoacryloyl radical or a chloroacetyl radical, m is 1 or 2 and p is 1 or 2 and in which the ring a can be substituted by hydroxyl or halogen.

In this formula, $R_1$ is preferably hydrogen or a secondary alkyl radical or a cycloalkyl radical having not more than 9 C atoms, for example 2-methyl-3-butyl, 2-pentyl, 3-pentyl, cyclopentyl, cyclohexyl, cyclohexyl substituted by 1 to 3 methyl groups and in particular isopropyl and 2-butyl.

Ar is preferably a radical of the benzene series, which can be substituted, for example by $C_1$-$C_4$-alkyl, $C_1$-$C_4$-alkoxy, $C_1$-$C_4$-alkylsulfonyl, carboxyl, sulfo, sulfamoyl, N-alkyl- or N-aryl-sulfamoyl or halogen. In particular, however, Ar is a phenylene radical substituted by not more than 3 methyl groups.

The ring a can carry a sulfo group or other substituents, for example halogen, especially chlorine, or hydroxyl.

A further group of anthraquinone dyes which are of particular interest are those of the formula

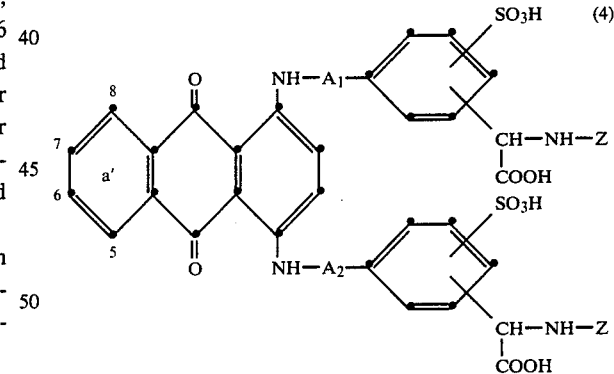

in which $A_1$ and $A_2$ are each an unbranched or branched alkylene radical having not more than 5 carbon atoms and Z is an α,β-dichloro- or -dibromo-propionyl radical, and α-chloro- or α-bromo-acryloyl radical or a chloroacetyl radical and in which the ring a' can be substituted by hydroxyl or halogen.

If the ring a' is substituted by hydroxyl groups, these are preferably in positions 5 and 8. Suitable halogen atoms are bromine and in particular chlorine. These are located, in particular, in positions 6 and/or 7 of the anthraquinone ring system.

The radicals $A_1$ and $A_2$ can be identical or different. Preferably, $A_1$ and $A_2$ are each 1-methylpropylene chains.

In addition to the anthraquinone dyes mentioned, azo dyes are also of interest, especially those of the formula

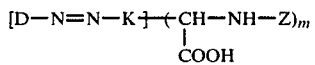  (5)

in which D is the radical of a diazo component of the benzene or naphthalene series and K is the radical of a coupling component, preferably the radical of a naphtholsulfonic acid, of an acetoacetanilide, of a pyrazol-5-one or of a naphtho-(1,2-d)-imidazole.

Preferably, D is a radical of the benzene series, which is substituted by $C_1$–$C_4$-alkyl, in particular methyl.

The radicals K are derived in particular from the following groups of coupling components:

naphtholsulfonic acids, for example 2-naphthol-3-, -4-, -5-, -6-, -7- or -8-sulfonic acid or 1-naphthol-3-, -4- or -5-sulfonic acid, acetoacetic acid arylides, especially acetoacetic acid anilides, which can be substituted in the anilide nucleus by chlorine, bromine, sulfo, $C_1$–$C_4$-alkyl and $C_1$–$C_4$-alkoxy, for example acetoacetanilide, acetoacetanilide-3- or -4-sulfonic acid, acetoacet-o-chloroanilide, acetoacet-o-toluidide, acetoacet-o-anisidide or acetoacet-m-xylidide, 5-pyrazolones or 5-aminopyrazoles which carry, in the 1-position, a phenyl radical which is unsubstituted or substituted by chlorine, nitro, sulfo, $C_1$–$C_4$-alkyl or $C_1$–$C_4$-alkoxy, for example 1-(2'-, 3'- or 4'-sulfophenyl)-3-methyl-pyrazol-5-one, 1-(2'-chloro-5'-sulfophenyl)-3-methyl-pyrazol-5-one, 1-(2',5'-dichloro-4'-sulfophenyl)-3-methyl-pyrazol-5-one, 1-(2'- or 4'-methylphenyl)-3-methyl-pyrazol-5-one or 1-(2'-, 3'- or 4'-methylphenyl)-3-methyl-pyrazol-5-one, and naphtho-(1,2-d)-imidazoles such as have been described in German Offenlegungsschrift No. 2,247,838, for example 1-(2'-chlorophenylamino)-9-hydroxy-2-methyl-1H-naphtho-(1,2-d)-imidazole-7-sulfonic acid, 1-(2',5'-disulfophenylamino)-9-hydroxy-2-methyl-1H-naphtho-(1,2-d)-imidazole-7-sulfonic acid or 1-(2'-chloro-5'-sulfophenylamino)-9-hydroxy-2-methyl-1H-naphtho-(1,2-d)-imidazole-7-sulfonic acid.

The novel dyes are prepared by reacting the corresponding dye compounds $$D\text{-}(H)_n \qquad (6)$$

in which D and n are as defined in formula (1) and H is a replaceable hydrogen atom bonded to an aromatic carbon atom of D, with a halogenoalkanoylamidoglycolic or halogenoacryloylamidoglycolic acid. This reaction takes place under the same conditions as the reaction with N-methylol compounds of aliphatic halogenocarboxylic acid amides or functional derivatives thereof (A. Einhorn, Liebigs Annalen der Chemie, 343, 207 (1905) and 361, 113 (1908)).

Chloroacetamidoglycolic acid has been disclosed in German Offenlegungsschrift No. 2,640,615. The dihalogenopropionamidoglycolic acids and the α-halogenoacryloylamidoglycolic acids are novel and also constitute a subject of the invention. The dihalogeno compounds are obtained by halogenation of acryloylamidoglycolic acid, and the α-halogenoacryloyl compounds are obtainable by eliminating hydrogen halide from the dihalogeno compounds by the action of alkali, for example sodium hydroxide solution. Dibromopropionamidoglycolic acid and the α-bromoacryloylamidoglycolic acid obtainable therefrom by the elimination of HBr are of particular interest.

If desired, this condensation reaction can be followed by yet further reactions, for example the resulting dye can be sulfonated and/or, if the reaction has been carried out using dibromopropionamidoglycolic acid, hydrogen bromide can subsequently be split off by treatment with alkali.

Thus, for example, the compounds of the formula (4) are advantageously prepared by reacting a compound of the formula

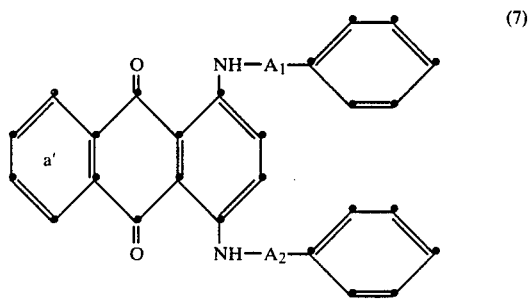  (7)

in which $A_1$ and $A_2$ are each an unbranched or branched alkylene radical having not more than 5 carbon atoms and the ring a' is unsubstituted or substituted by hydroxyl or halogen, with 2 equivalents of α,β-dichloro- or α,β-dibromo-propionamidoglycolic acid, α-chloro- or α-bromoacryloylamidoglycolic acid or chloroacetamidoglycolic acid and subsequently sulfonating the reaction product.

The condensation reaction of the dyes with the acylamidoglycolic acids is carried out in the presence of acid condensing agents or of dehydrating agents which react as acid condensing agents. Agents of this type which can be used are, in particular, concentrated hydrochloric acid, zinc chloride, phosphorus pentoxide, acetic anhydride, phosphoric acid and oleum. The preferred condensing agent is, however, concentrated to anhydrous sulfuric acid, since in most cases this can at the same time serve as the solvent for the reactants. The reaction temperature can vary within wide limits and depends in particular on the condensing agent used. In concentrated sulfuric acid the reaction in most cases already proceeds rapidly and goes to completion at room temperature. In some cases it is necessary to carry out the reaction at elevated temperature, for example at 40° to 80° C. The finished reaction products are precipitated by pouring the solutions or suspensions containing sulfuric acid into ice-water and are isolated in the conventional manner.

Taking into consideration the ready accessibility and with regard to the good dyeing properties of the end products obtainable therefrom, in particular α,β-dibromopropionamidoglycolic acid is used as the halogenoalkanoylamidoglycolic acid.

The novel dyes are suitable for dyeing and printing very diverse materials, for example those of animal origin, such as leather, silk and in particular wool, and also diverse synthetic fibres, for example made of high molecular weight polyamides and high molecular weight polyurethanes. They are particularly suitable for dyeing from a neutral to acid medium.

The novel dyes are also suitable for dyeing and printing cellulose-containing materials, such as cotton and regenerated cellulose fibres, and for fixing on these materials they are subjected to a heat treatment in the presence of alkali, for example in the presence of sodium (hydrogen) carbonate, sodium hydroxide or trisodium phosphate.

They are particularly suitable for dyeing wool from a weakly acid bath, for example a bath containing acetic acid, in the presence of wetting agents and levelling agents, especially in the presence of polyglycol ether derivatives which on average contain 5 to 10 —CH$_2$—CH$_2$—O— groups and are derived from primary monoamines which contain an aliphatic hydrocarbon radical having 15 to 20 carbon atoms.

The dyeings obtained with the novel dyes are distinguished by good fastness to light and fastness to rubbing and excellent wet fastness properties, for example fastness to washing, fastness to water, fastness to perspiration, fastness to damp heat and fastness to milling. They have good solubility in water and a high degree of fixation and give deep, level dyeings.

In the examples which follow parts are by weight, unless indicated otherwise, percentages are by weight and temperatures are in degrees centigrade.

EXAMPLE 1

78 parts of acryloylamidoglycolic acid monohydrate are brominated with 77 parts of bromine in 500 parts of carbon tetrachloride at room temperature. After 20 hours the reaction has gone to completion and the viscous suspension is filtered with suction and the material on the filter is washed with carbon tetrachloride until the wash liquid remains colourless. The material on the suction filter is dried in vacuo at 60° C.; 143 parts of dibromopropionamidoglycolic acid of the formula:

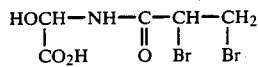

are obtained.

A mixture of 16 parts of the dibromopropionamidoglycolic acid thus obtained and 24 parts of the sodium salt of 1-amino-4-mesidinoanthraquinone-2-sulfonic acid of the formula

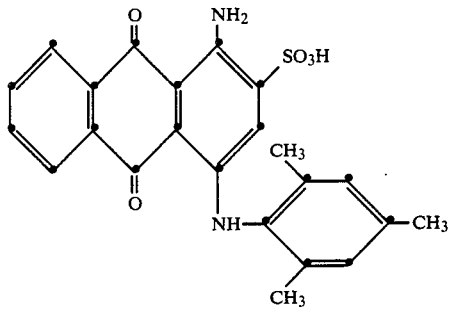

is dissolved in 125 parts of 96% sulfuric acid at 10° to 15°. The reaction mixture is stirred at this temperature for a further 15 hours and is then poured into an ice/water mixture, and the dye which has precipitated is filtered off with suction.

The residue thus obtained is suspended in water and isolated in the form of the sodium salt in a conventional manner. A water-soluble blue dye of the formula:

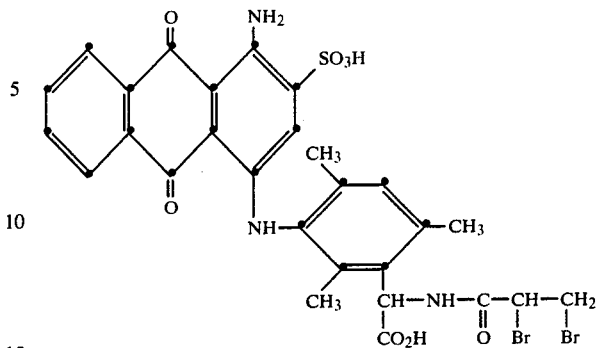

is obtained which dyes wool, preferably in the presence of levelling agents (for example a condensation product of higher aliphatic amines with ethylene oxide) from an acetic acid bath in brillant blue shades which are fast to wet processing and have good fastness to light.

EXAMPLE 2

The 16 parts of dibromopropionamidoglycolic acid are replaced by 32 parts of the same compound and the procedure according to the instructions of Example 1 is repeated. A bis-reactive dye of the formula:

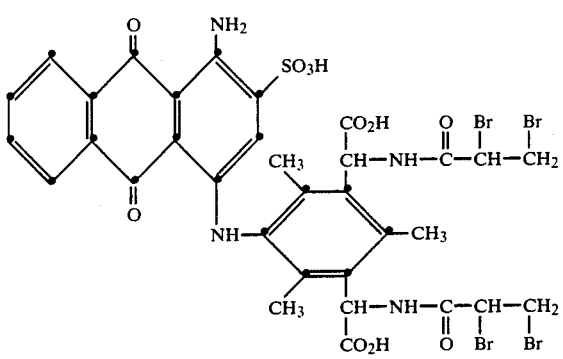

is thus obtained which has very good dyeing properties and excellent wet fastness properties.

EXAMPLE 3

78 parts of acryloylamidoglycolic acid monohydrate are suspended in 500 parts of carbon tetrachloride and 34 parts of chlorine are passed in at room temperature in the course of 4 hours. The suspension is filtered with suction and the material on the filter is washed with carbon tetrachloride. The material on the suction filter is dried in vacuo at 60°; 102 parts of dichloropropionamidoglycolic acid of the formula:

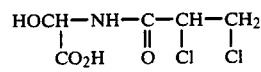

are obtained.

A mixture of 12 parts of the dichloropropionamidoglycolic acid thus obtained and 24 parts of the sodium salt of 1-amino-4-mesidinoanthraquinone-2-sulfonic acid are subjected to a condensation reaction using the procedure of Example 1. This yields the reactive dye of the formula:

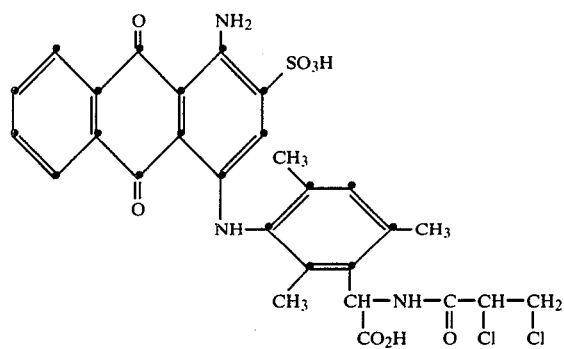

which dyes wool in sky-blue shades which are fast to wet processing.

EXAMPLE 4

76.5 parts of the dye obtainable according to Example 1 are dissolved in 500 parts of water, the solution is cooled to 10° with the addition of ice and 12 parts by volume of 10N sodium hydroxide solution are added. After stirring for a further 30 minutes at 10°–15°, the solution is neutralised by adding about 10 parts by volume of 1N hydrochloric acid and the dye is precipitated by adding sodium chloride, filtered off and dried in vacuo at 60°–70°. This yields a bromoacryl derivative of the formula:

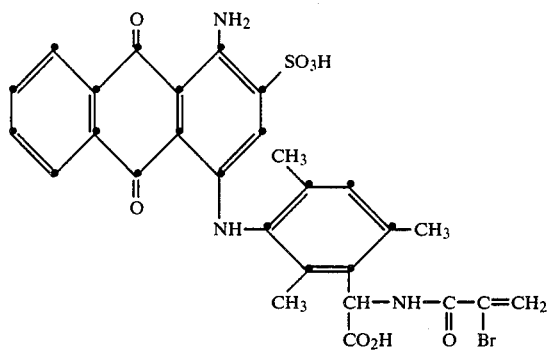

which is readily soluble in water and which dyes wool in sky-blue shades with good fastness properties.

EXAMPLE 5

The above example is repeated except that the 76.5 parts of the dye obtainable according to Example 1 are replaced by 67.5 parts of the corresponding dichloro derivative according to Example 3. An otherwise identical procedure yields the dye of the formula:

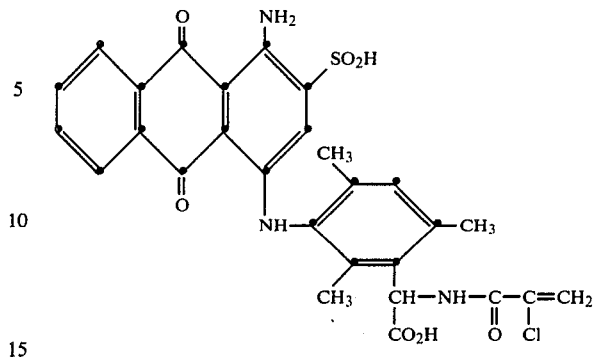

which has very similar properties.

EXAMPLE 6

A mixture of 9 parts of chloroacetamidoglycolic acid and 24 parts of the sodium salt of 1-amino-4-mesidinoanthraquinone-2-sulfonic acid is dissolved in 125 parts of 96% sulfuric acid at 10°–15°. The reaction mixture is stirred at this temperature for a further 15 hours and is then poured into an ice/water mixture, and the dye which has precipitated is filtered off with suction.

The residue thus obtained is suspended in water and isolated in the form of the sodium salt in a conventional manner. A reactive dye of the formula:

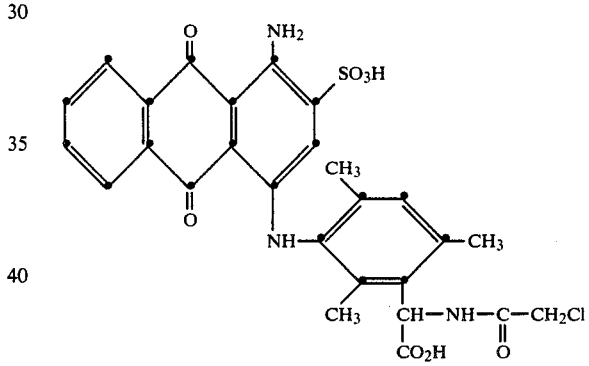

is obtained which dyes wool in sky-blue shades which are fast to wet processing and have good fastness to light.

When the procedure of Example 1 is repeated except that the 24 parts of the sodium salt of 1-amino-4-mesidinoanthraquinone-2-sulfonic acid are replaced by equivalent parts of the dyes listed in column II of the table which follows and these are reacted with the parts of dibromopropionamidoglycolic acid indicated in column III, the reactive dyes according to column IV are obtained, the colour shades of these dyes on wool being indicated in column V of the table.

| I Example | II Dye | III Parts of dibromo-propionamido-gylcolic acid | IV Reactive dye (R = —CH—NH—C—CH—CH$_2$ ; COOH, O, Br, Br) | V Shade on wool |
|---|---|---|---|---|
| 7 | (anthraquinone dye structure with Cl, NH$_2$, SO$_3$H, NH-mesityl) | 16 parts | (same dye with R substituent) | neutral blue |
| 8 | (anthraquinone dye structure with Cl, NH$_2$, SO$_3$H, NH-mesityl) | 32 parts | (same dye with R substituents) | neutral blue |
| 9 | (anthraquinone dye with HO$_3$S, NH$_2$, SO$_3$H, NH-mesityl) | 16 parts | (same dye with R substituent) | neutral blue |
| 10 | (anthraquinone dye with HO$_3$S, NH—CH(CH$_3$)$_2$, NH-mesityl) | 32 parts | (same dye with R substituents) | greenish-tinged blue |

-continued

| I Example | II Dye | III Parts of dibromo-propionamido-gylcolic acid | IV Reactive dye (R = —CH—NH—C—CH—CH$_2$ \| \| \| \| COOH O Br Br) | V Shade on wool |
|---|---|---|---|---|
| 11 | [anthraquinone dye structure with NH$_2$, SO$_3$H, NH-C$_6$H$_3$(OCH$_3$)] | 16 parts | [same anthraquinone with R substituent on phenyl ring] | greenish-tinged blue |
| 12 | [anthraquinone dye with NH-CH(CH$_3$)$_2$ and NH-2,6-dimethylphenyl, HO$_3$S] | 16 parts | [same anthraquinone with R on dimethylphenyl ring] | greenish-tinged blue |
| 13 | [azo dye with chloro-acetamido group, naphthol-disulfonic, mesityl azo] | 16 parts | [same structure with R on mesityl ring] | red |
| 14 | [naphthalene azo dye with NH$_2$, OH, SO$_3$H groups] | 16 parts | [same structure with R substituent] | bluish-tinged red |

-continued

| I Example | II Dye | III Parts of dibromo-propionamido-glycolic acid | IV Reactive dye (R = —CH—NH—C—CH—CH$_2$ / COOH / O / Br / Br) | V Shade on wool |
|---|---|---|---|---|
| 15 | Dye structure: CH$_3$-C$_6$H$_4$-SO$_2$-C$_6$H$_3$(SO$_3$H)-N=N-C$_6$H$_3$(CH$_3$)-N(C$_2$H$_5$)(CH$_2$-C$_6$H$_5$) | 16 parts | Same dye with R substituent on benzyl ring | Red |
| 16 | Dye structure: CH$_3$-C$_6$H$_4$-SO$_2$-C$_6$H$_3$(SO$_3$H)-N=N-C$_6$H$_4$-N(C$_2$H$_5$)(CH$_2$-C$_6$H$_5$) | 16 parts | Same dye with R substituent on benzyl ring | Orange |
| 17 | Dye structure: CH$_3$-C$_6$H$_4$-N=N- naphthalene with NHCOCH$_3$, HO, SO$_3$H, HO$_3$S substituents | 16 parts | Same dye with R substituent on tolyl ring | Red |
| 18 | Dye structure: HO$_3$S-C$_6$H$_4$-N=N-C$_6$H$_4$-N=N- naphthalene-OH | 16 parts | Same dye with R substituent on naphthalene | Red |

-continued

| I Example | II Dye | III Parts of dibromo-propionamidogylcolic acid | IV Reactive dye (R = —CH—NH—C—CH—CH$_2$ / COOH / O / Br / Br) | V Shade on wool |
|---|---|---|---|---|
| 19 | (structure) | 16 parts | (structure) | Orange |
| 20 | (structure) | 16 parts | (structure) | Black |
| 21 | (structure) | 16 parts | (structure) | Brown |
| 22 | (structure) | 16 parts | (structure) | Orange |
| 23 | (structure) | 16 parts | (structure) | Scarlet |

-continued

| I Example | II Dye | III Parts of dibromo-propionamido-glycolic acid | IV Reactive dye (R = —CH—NH—C—CH—CH$_2$ with COOH, O, Br, Br) | V Shade on wool |
|---|---|---|---|---|
| 24 | [structure: HO$_3$S-benzothiazole-N=N-phenyl(CH$_3$)-N(C$_2$H$_5$)(CH$_2$-phenyl)] | 16 parts | [structure with R on benzyl group] | Red |
| 25 | [naphthol disazo structure with H$_3$C, CH$_3$, NH, SO$_3$H, O-phenyl-H] | 32 parts | [same structure with R substituents] | Red |
| 26 | [CF$_3$, NH$_2$, N=N, HO, SO$_3$H naphthalene] | 16 parts | [same with R on CF$_3$ ring] | Red |
| 27 | [HO$_3$S-phenyl-N=N-naphthyl-N=N-phenyl-N(C$_2$H$_5$)(CH$_2$-phenyl-SO$_3$H)] | 16 parts | [same with R substituents] | Claret |

-continued

| I Example | II Dye | III Parts of dibromo-propionamido-gylcolic acid | IV Reactive dye (R = —CH—NH—C—CH—CH$_2$ / COOH / O / Br / Br) | V Shade on wool |
|---|---|---|---|---|
| 28 | pyrazolone azo dye (2,4,6-trimethylphenyl / 3-sulfophenyl) | 16 parts | pyrazolone azo dye with R substituent (3-sulfophenyl) | yellow |
| 29 | pyrazolone azo dye (2,4,6-trimethylphenyl / 4-sulfophenyl) | 16 parts | pyrazolone azo dye with R substituent (4-sulfophenyl) | yellow |
| 30 | pyrazolone azo dye (2,4,6-trimethylphenyl / 2,5-dichloro-4-sulfophenyl) | 16 parts | pyrazolone azo dye with R substituent (2,5-dichloro-4-sulfophenyl) | yellow |

| I Example | II Dye | III Parts of dibromo-propionamido-gylcolic acid | IV Reactive dye (R = —CH—NH—C—CH—CH$_2$ / COOH / O / Br / Br) | V Shade on wool |
|---|---|---|---|---|
| 31 | (structure) | 16 parts | (structure) | yellow |
| 32 | (structure) | 16 parts | (structure) | yellow |
| 33 | (structure) | 16 parts | (structure) | yellow |

-continued

| I Example | II Dye | III Parts of dibromo-propionamido-gylcolic acid | IV Reactive dye (R = —CH—NH—C—CH—CH$_2$<br>          \|         \|\|  \|    \|<br>         COOH    O  Br   Br) | V Shade on wool |
|---|---|---|---|---|
| 34 | [pyrazolone azo dye structure with CH$_3$, SO$_3$H, HO, N-phenyl] | 16 parts | [same dye with R substituent on phenyl] | yellow |
| 35 | [pyrazolone azo dye with dichloro, HO$_3$S, H$_2$N, N-phenyl] | 16 parts | [same dye with R substituent on phenyl] | yellow |
| 36 | [pyrazolone azo dye with SO$_3$H, HO, dichlorodiphenyl ether] | 16 parts | [same dye with R substituent] | yellow |

-continued

| I Example | II Dye | III Parts of dibromo-propionamido-glycolic acid | IV Reactive dye (R = —CH—NH—C—CH—CH₂ with COOH, O, Br, Br) | V Shade on wool |
|---|---|---|---|---|
| 37 | (structure: pyrazolone azo dye with Cl, CH₃, HO, N=N, chlorophenyl, dimethylphenyl-SO₃H) | 16 parts | (structure: pyrazolone azo dye with R substituent) | yellow |
| 38 | (structure: pyrazolone with CH₃, H₂N, N=N, dichlorophenyl, HO₃S-naphthyl, phenyl) | 16 parts | (structure: similar pyrazolone with R substituent on phenyl) | yellow |
| 39 | (structure: pyrazolone with CH₃, HO, Cl, SO₃H, naphthylsulfonic azo, dichlorophenyl-SO₃H) | 16 parts | (structure: similar with R substituent) | yellow |
| 40 | (structure: bis-azo dye with OC₂H₅, SO₃H, phenyl groups) | 16 parts | (structure: bis-azo dye with OC₂H₅, HO₃S, R substituent) | golden yellow |

EXAMPLE 41

A homogeneous mixture of 25 parts of the compound of the formula

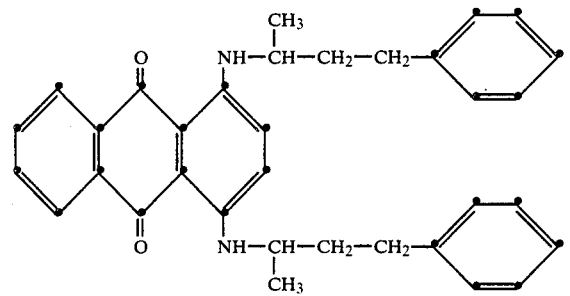

and 32 parts of dibromopropionamidoglycolic acid (obtained according to Example 1) is introduced into 180 parts of 90% sulfuric acid at a temperature of 5°–10° and the resulting solution is then stirred at the same temperature for 15 hours. For sulfonation, 180 parts of 65% oleum are allowed to run in at 10°–15° and the sulfonation mixture is poured into an ice/water mixture. The bis-reactive dye of the formula:

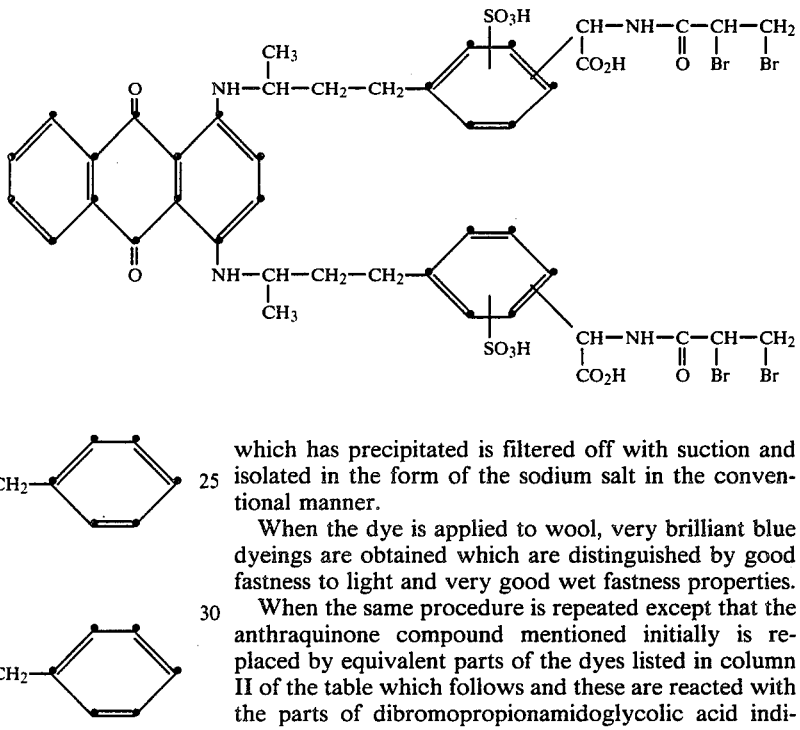

which has precipitated is filtered off with suction and isolated in the form of the sodium salt in the conventional manner.

When the dye is applied to wool, very brilliant blue dyeings are obtained which are distinguished by good fastness to light and very good wet fastness properties.

When the same procedure is repeated except that the anthraquinone compound mentioned initially is replaced by equivalent parts of the dyes listed in column II of the table which follows and these are reacted with the parts of dibromopropionamidoglycolic acid indicated in column II and the reaction products are sulfonated, the reactive dyes according to column IV are obtained; the colour shades of these dyes on wool are indicated in column V of the table.

| I Example | II Dye | III Parts of dibromopropion-amidoglycolic acid | IV Reactive dye (R—CH—NH—C—CH—CH$_2$)<br>COOH · O · Br · Br | V Shade on wool |
|---|---|---|---|---|
| 42 | (1,4-bis(benzylamino)anthraquinone structure) | 32 parts | (1,4-bis(benzylamino)anthraquinone with R and SO$_3$H on phenyl rings) | neutral blue |
| 43 | (1,4-bis(2-methyl-2-phenylpropylamino)anthraquinone structure with CH$_3$ groups) | 32 parts | (same as example 43 dye with R and SO$_3$H substituents on phenyl rings) | neutral blue |

-continued

| I Example | II Dye | III Parts of dibromopropion-amidoglycolic acid | IV Reactive dye (R—CH—NH—C—CH—CH$_2$) COOH O Br Br | V Shade on wool |
|---|---|---|---|---|
| 44 | anthraquinone with NH–CH$_2$–CH(CH$_3$)–phenyl substituents | 32 parts | anthraquinone with NH–CH$_2$–CH(CH$_3$)–(phenyl-SO$_3$H, R) substituents | blue |
| 45 | anthraquinone with NH–CH$_2$–CH$_2$–C(CH$_3$)$_2$–phenyl substituents | 32 parts | anthraquinone with NH–CH$_2$–CH$_2$–C(CH$_3$)$_2$–(phenyl-SO$_3$H, R) substituents | neutral blue |

-continued
| I Example | II Dye | III Parts of dibromopropion-amidoglycolic acid | IV Reactive dye (R—CH—NH—C—CH—CH$_2$ / COOH / O / Br / Br) | V Shade on wool |
|---|---|---|---|---|
| 46 | 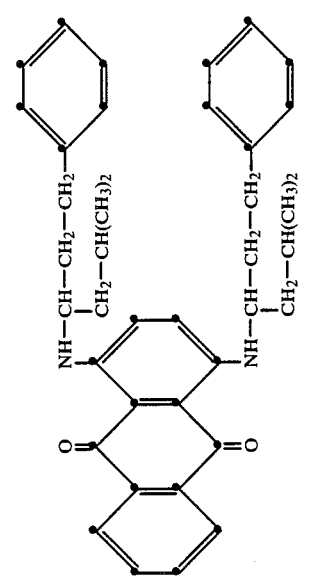 | 32 parts | 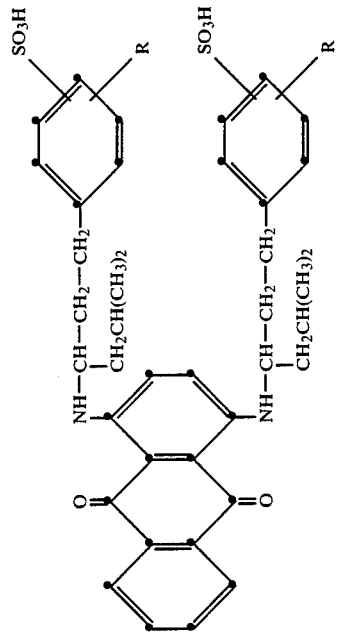 | neutral blue |
| 47 | 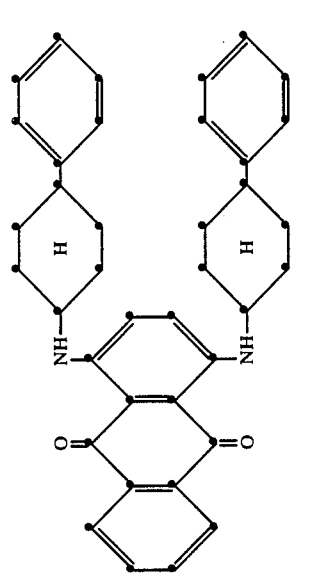 | 32 parts | 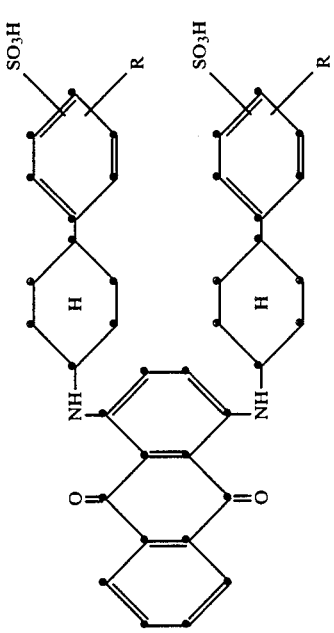 | neutral blue |

-continued
| I Example | II Dye | III Parts of dibromopropion-amidogly-colic acid | IV Reactive dye (R—CH—NH—C—CH—CH$_2$<br>          COOH    O   Br   Br) | V Shade on wool |
|---|---|---|---|---|
| 48 | 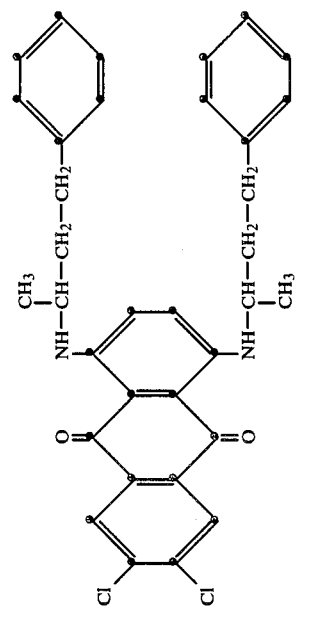 | 32 parts | 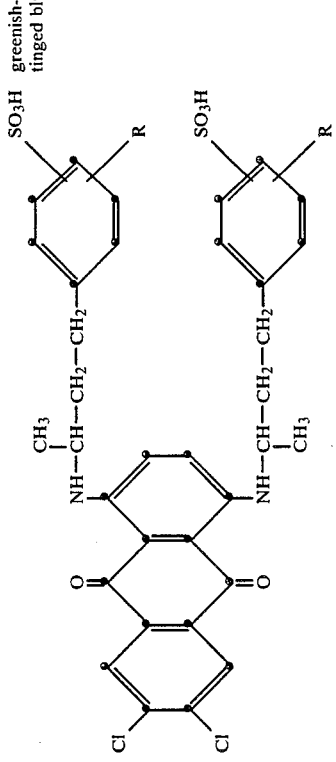 | greenish-tinged blue |
| 49 | 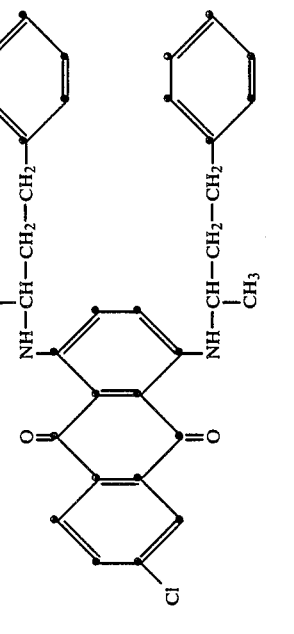 | 32 parts | 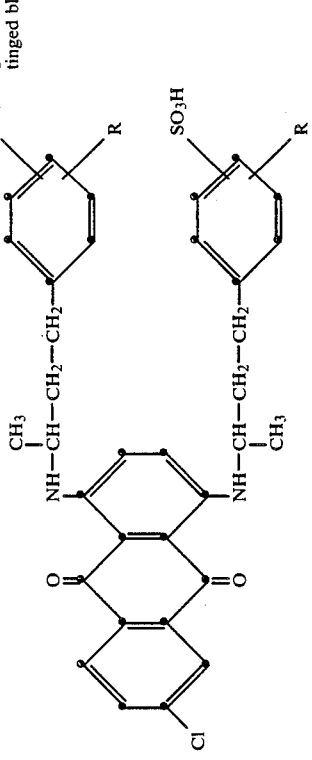 | greenish-tinged blue |

-continued

| I Example | II Dye | III Parts of dibromopropion-amidogly-colic acid | IV Reactive dye (R—CH—NH—C—CH—CH$_2$)<br>       COOH   O  Br  Br | V Shade on wool |
|---|---|---|---|---|
| 50 | anthraquinone dye with NH—CH(CH$_3$)—CH$_2$CH$_2$—phenyl groups and HO groups | 32 parts | corresponding reactive dye with R-substituted phenyl bearing SO$_3$H | greenish-tinged blue |
| 51 | anthraquinone dye with NH—CH(CH$_3$)—CH$_2$—CH(CH$_3$)$_2$ type groups and phenyl substituents | 16 parts | corresponding reactive dye with R-substituted phenyl bearing SO$_3$H | neutral blue |

-continued

| I Example | II Dye | III Parts of di-bromopropion-amidogly-colic acid | IV Reactive dye (R—CH—NH—C—CH—CH$_2$)<br>    $\phantom{R—CH—NH—}$COOH $\phantom{—}$O $\phantom{—}$Br $\phantom{—}$Br | V Shade on wool |
|---|---|---|---|---|
| 52 | (anthraquinone structure with NH$_2$, O-phenyl-C(CH$_3$)$_2$-CH$_2$CH$_3$ and NH-xylyl groups) | 16 parts | (corresponding reactive dye structure with SO$_3$H and R group) | violet |
| 53 | (anthraquinone structure with two NH groups, benzoyl substituent, phenoxy with C(CH$_3$)$_2$CH$_2$CH$_3$) | 16 parts | (corresponding reactive dye structure with SO$_3$H and R group) | bluish-tinged red |

-continued

| I Example | II Dye | III Parts of dibromopropion-amidogly-colic acid | IV Reactive dye (R—CH—NH—C—CH—CH₂) <br>                                \|    \|   \|<br>                              COOH O Br | V Shade on wool |
|---|---|---|---|---|
| 54 | (structure) | 16 parts | (structure) | red |
| 55 | (structure) | 16 parts | (structure) | red |

-continued

| I Example | II Dye | III Parts of dibromopropion-amidoglycolic acid | IV Reactive dye (R—CH—NH—C—CH—CH$_2$) <br> COOH    O   Br   Br | V Shade on wool |
|---|---|---|---|---|
| 56 | [anthraquinone with two NH-phenyl groups, and two OH groups] | 32 parts | [same anthraquinone structure with R and SO$_3$H substituents on phenyl rings] | green |
| 57 | [anthraquinone with two NH-(2,4,6-trimethylphenyl) groups, fused benzo] | 32 parts | [same structure with SO$_3$H and R substituents on the trimethylphenyl rings] | neutral blue |

| I Example | II Dye | III Parts of dibromopropion-amidoglycolic acid | IV Reactive dye (R—CH—NH—C—CH—CH₂)<br>COOH  O  Br  Br | V Shade on wool |
|---|---|---|---|---|
| 58 | (anthraquinone structure with 2,6-diethyl-4-methylanilino groups) | 32 parts | (anthraquinone structure with 2,6-diethyl-4-methyl-sulfonated anilino groups bearing R) | greenish-tinged blue |
| 59 | (anthraquinone structure with 2,6-dimethyl-4-methylanilino groups) | 32 parts | (anthraquinone structure with 2,6-dimethyl-4-methyl-sulfonated anilino groups bearing R) | greenish-tinged blue |

Dyeing Example 100 parts of wool piece yarn are put, at 50° to 80°, into a dyebath which contains 10 parts of crystalline sodium sulfate, 6 parts of 40% acetic acid, 0.5 part of a condensation product of higher aliphatic amines with ethylene oxide and 2 parts of the dye described in Example 1 in 3,000 parts of water. The bath is heated to the boil in the course of half an hour and dyeing is then carried out at the boil for 1 hour. The wool is then rinsed and dried. A uniform blue dyeing is obtained.

What is claimed is:

1. A compound of the formula

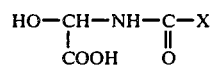

in which X is a radical of the formula —CHCl—CH$_2$Cl, —CHBr—CH$_2$Br, —CCl=CH$_2$ or —CBr=CH$_2$.

* * * * *